United States Patent [19]

Kim

[11] Patent Number: 5,790,222

[45] Date of Patent: Aug. 4, 1998

[54] THIN FILM TRANSISTOR ARRAY AND METHOD OF MANUFACTURING THEREOF

[75] Inventor: Byeong-Koo Kim, Kyungki-do, Rep. of Korea

[73] Assignee: LG Electronics Inc., Seoul, Rep. of Korea

[21] Appl. No.: 795,376

[22] Filed: Feb. 4, 1997

[30] Foreign Application Priority Data

Jun. 14, 1996 [KR] Rep. of Korea ................ 1996 21416

[51] Int. Cl.$^6$ .......................... G02F 1/136; G02F 1/1343
[52] U.S. Cl. .................. 349/139; 349/42; 349/147
[58] Field of Search ................. 349/39, 139, 147, 349/42; 257/59

[56] References Cited

U.S. PATENT DOCUMENTS

| | | | |
|---|---|---|---|
| 5,107,355 | 4/1992 | Satoh et al. | 349/87 |
| 5,153,754 | 10/1992 | Whetten et al. | 349/147 |
| 5,334,860 | 8/1994 | Naito | 349/147 |
| 5,414,278 | 5/1995 | Kobayashi et al. | 349/39 |
| 5,541,748 | 7/1996 | Ono et al. | 349/139 |
| 5,604,358 | 2/1997 | Kim | 257/59 |

*Primary Examiner*—William L. Sikes
*Assistant Examiner*—Toan Ton
*Attorney, Agent, or Firm*—Finnegan, Henderson, Farabow, Garrett & Dunner, L.L.P.

[57] ABSTRACT

A TFT array having an improved aperture ratio with significantly increasing capacitive coupling between the pixel electrode and the drain bus line is disclosed. The TFT array includes a plurality of data bus line segments interconnected by the source electrode metallization. Further, a plurality of insulating layers are provided on the substrate to increase the separation between the pixel electrodes and the data bus lines.

13 Claims, 8 Drawing Sheets

(Prior Art)

THIN FILM TRANSISTOR ARRAY AND METHOD OF MANUFACTURING THEREOF

BACKGROUND OF THE INVENTION

1. Field of the Invention

The present invention relates to a thin film transistor liquid crystal display (TFT-LCD), and more particularly, to a thin film transistor array and a related method.

2. Description of Related Art

Figure 1:
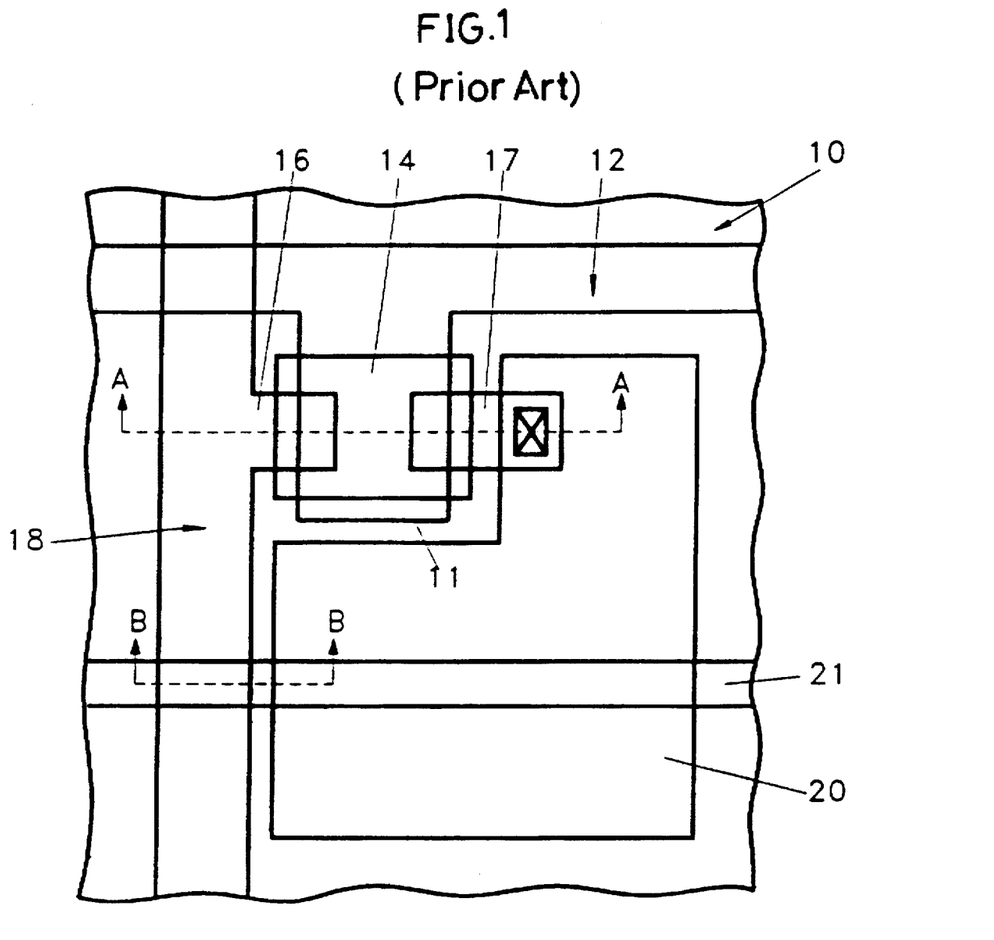
FIG. 1 is a plan view of the conventional TFT array.
Figure 2:
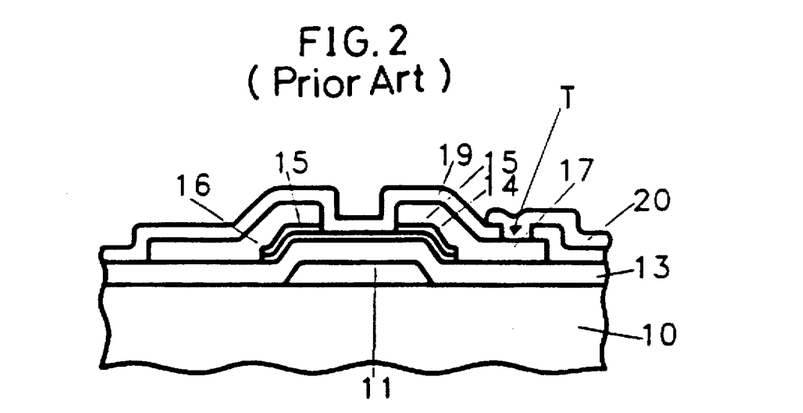
FIG. 2 is a cross-sectional view of the conventional TFT array, taken along line A–A' in FIG. 1.
Figure 3:
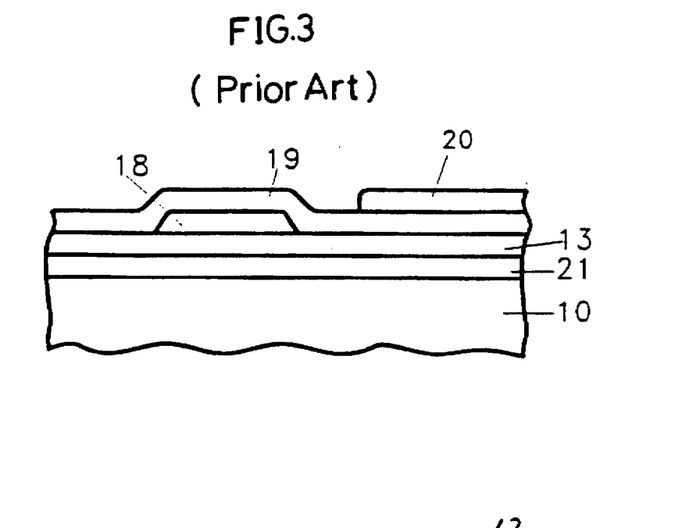
FIG. 3 is a cross-sectional view of the conventional TFT array, taken along line B–B' in FIG. 1.

FIG. 1 is a plane view of a TFT array of a conventional TFT-LCD. FIG. 2 is a cross-sectional view taken along line A–A' in FIG. 1. FIG. 3 is a cross-sectional view taken along line B–B' in FIG. 1.

As shown in FIG. 1, a gate electrode 11, consisting of a metal material, such as a chrome (Cr), is provided extending from gate bus line 12, is formed on a glass substrate 10. A gate insulating film 13 consisting of silicon oxide or a silicon nitride is formed on glass substrate 10, and island-shaped amorphous silicon (a-Si) layer 14, as well as, impurity-doped amorphous silicon (n+a-Si) layer 15 are successively formed on gate insulating film 13. Source and drain electrodes, 16 and 17, respectively, electrically contact opposite sides of impurity-doped amorphous silicon layer 15. As a result, source electrode 16 and drain electrode 17 are separated by a predetermined distance.

As further shown in FIG. 1, source electrode 16 extends from a data bus line 18 and crosses gate bus line 12. A passivation film 19 is formed to cover the entire surface of the substrate, and a pixel electrode 20 is formed on a predetermined region of the substrate. A contact hole (T) is created in passivation film 19 over a portion of drain electrode 17, such that drain electrode 17 and pixel electrode 20 are connected together through contact hole (T). First capacitor electrode 21 is associated with a storage capacitor.

In a conventional TFT array, as shown in FIGS. 1 and 3, pixel electrode 20 and data bus line 18 are separated by passivation film 19. To achieve a high aperture ratio, however, the area of pixel electrode 20 must be increased. As a result, the distance between data bus line 18 and pixel electrode 20 is reduced. If these two conductors are too close to each other, however, capacitive coupling can occur, otherwise known as "vertical cross-talk", which can cause interference in signal applied to pixel electrode 20. Accordingly, it would be beneficial to provide a TFT array and related fabrication method that minimizes vertical cross-talk.

SUMMARY OF THE INVENTION

Accordingly, the present invention fulfills this need by providing a TFT array and a method of manufacturing thereof that substantially obviates one or more of the problems due to limitations and disadvantages of the related art. In particular, the present invention provides a TFT array with limited vertical crosstalk, even when the data bus line and the pixel electrode are formed across from each other.

Additional features and advantages of the invention will be set forth in the description which follows, and in part will be apparent from the description, or may be learned by practice of the invention. Other advantages of the invention will be realized and attained by the structure particularly pointed out in the written description and claims hereof as well as the appended drawings.

To achieve these and other advantages and in accordance with the purpose of the present invention, as embodied and broadly described, there is provided a thin film transistor array comprising: an insulating substrate; at least one or more gate bus lines formed on the insulating substrate; a lower data bus line separated by the gate bus line, the lower data bus line formed in the direction perpendicular to the gate bus line; a first insulating film covering the gate bus line and the lower data bus line, the first insulating film having a contact hole on the lower data bus line; an upper data bus line formed on the first insulating film and connecting two adjacent data bus lines together through the contact hole in the first insulating film; and a second insulating film formed on the upper data bus line.

In another aspect, the present invention provides a method of manufacturing a TFT array, comprising the steps of: forming at least one or more gate bus lines on an insulating substrate and a lower data bus line on a region between the adjacent gate bus lines; forming an insulating material on the gate bus line and the lower data bus line and forming a first insulating film having a first contact hole in the insulating material on a region of the lower data bus line; forming an upper data bus line of a conductive material so as to connect two lower data bus lines together through the first contact hole; and forming a second insulting film on the upper data bus line.

It should be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention, and together with the description serve to explain the principles of the drawings.

In the drawings.

DETAILED DESCRIPTION OF PREFERRED EMBODIMENT

Reference will now be made in detail to the preferred embodiments of the present invention, examples of which are illustrated in the accompanying drawings.

Figure 4:
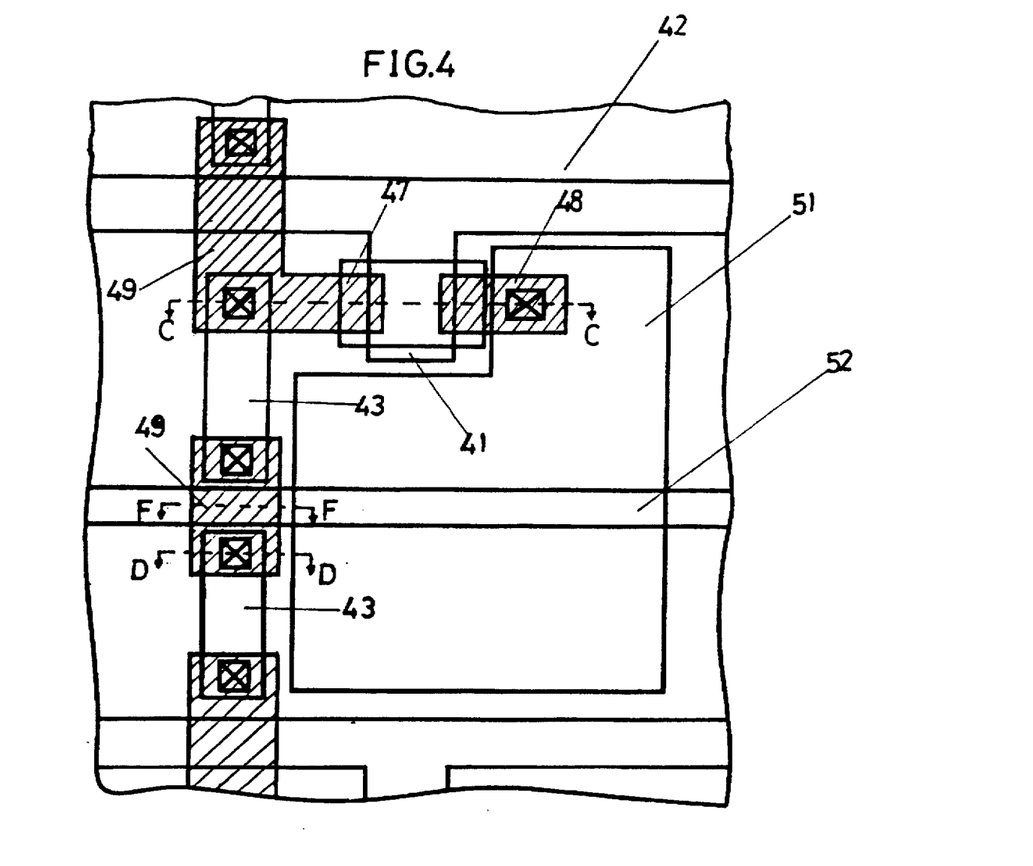
FIG. 4 is a plan view of a TFT array consistent with a first embodiment of the present invention.

FIG. 4 is a plan view of a TFT array in accordance with a first embodiment of the present invention. As seen in FIG.

4, a plurality of gate bus lines 42 typically including a metal material are formed on an insulating substrate 40, and a plurality of gate electrodes 41 are formed extending from respective gate bus lines 42. A lower data bus line 43 is formed on a region of substrate 40 between two adjacent gate bus lines 42. Lower data bus lines 43 are connected to one another through an upper data bus line 49 crossing gate bus line 42 and are separated by at least two or more insulating films. Upper data bus line 49 is formed to be connected with a source electrode 47 of the TFT which is used as a pixel switch. A pixel electrode 51 is connected with a drain electrode 48 of the TFT.

In the present embodiment, a storage capacitor includes a first capacitor electrode 52 of the storage capacitor is formed on the same layer as that of lower data bus line 43. Therefore, lower data bus line 43 is formed such that it cuts into this region. Moreover, these lower data bus lines 43 are connected with each other by upper data bus line 49.

Figure 5:
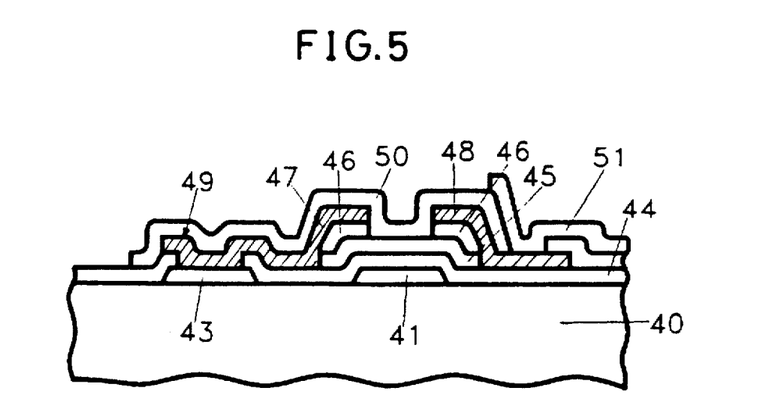
FIG. 5 is a cross-sectional view of the first embodiment of the present invention, taken along line C–C' in FIG.4.

FIG. 5 is a cross-sectional view of the first embodiment of the present invention, taken along line C–C' in FIG. 4. FIG. 5 shows the connection between the upper and lower data bus lines 43 and 49, and a vertical cross-sectional structure of the TFT and pixel electrode 51.

As seen in FIG. 5, a first electrode, i.e., a gate electrode 41 is located in the lowest part of is an insulating layer 40. Lower data bus line 43 is separated from gate electrode 41 by a predetermined distance. Next, a gate insulating film 44 and two semiconductor layers, i.e., an amorphous silicon (a-Si) layer 45 and an impurity-doped amorphous silicon (n+a-Si) layer 46, are successively deposited on gate electrode 41. At this time, impurity-doped amorphous silicon layer 46 is cut at the center of amorphous silicon layer 45 to create two horizontally spaced layers, separated by a predetermined distance. A source electrode 47 and a drain electrode 48 are formed to contact each impurity-doped amorphous silicon layer 46.

Next, source electrode 47 is formed together with upper data bus line 49 and connected with lower data bus line 43 through a first contact hole in gate insulating film 44.

A passivation film 50 is formed on upper data bus line 49, amorphous silicon layer 45, source electrode 47, and drain electrode 48. A second contact hole is formed in passivation film 50 on the region of drain electrode 48, so that a pixel electrode 51 created on passivation film 50 and drain electrode 48 are connected together through the second contact hole.

Figure 6:
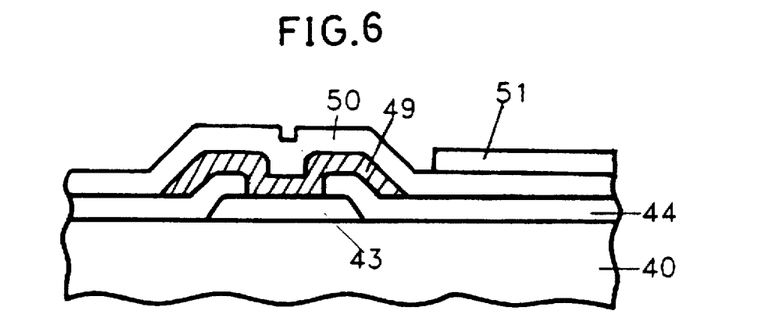
FIG. 6 is a cross-sectional view of the first embodiment of the present invention, taken along line D–D' in FIG.4.

FIG. 6 is a cross-sectional view of the first embodiment of the present invention, taken along line D–D' in FIG. 4, and shows the connection between upper and lower data bus lines 43 and 49.

In this embodiment, a lower data bus line 43 is located on an insulating substrate 40 and covered by an upper data bus line 49 having a first contact hole, as shown in FIG. 6. Upper data bus line 49 is connected to lower data bus line 43 through the first contact hole. Next, a passivation film 50 is formed to cover upper data bus line 49, and a pixel electrode 51 is formed on a predetermined region of passivation film 50.

Figure 7:
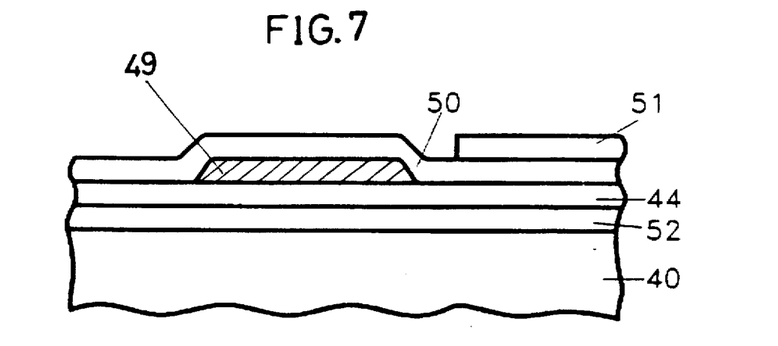
FIG.7 is a cross-sectional view of the first embodiment of the present invention, taken along line F–F' in FIG. 4.

FIG. 7 is a cross-sectional view of the first embodiment of the present invention, taken along line F–F' in FIG. 4, and shows a cross-sectional structure of a region along which a first capacitor electrode 52 lies.

As shown in FIG. 7, a first capacitor electrode 52 lies on an insulating substrate 40, and is covered by a gate insulating film 44. Upper data bus line 49 lies in a direction crossing first capacitor electrode 52, and it, in turn, is covered by passivation film 50. Next, a pixel electrode 51 is formed on passivation film 50.

Although not shown, a cross-sectional structure of a region along which a gate bus line 42 passes is similar to that shown in FIG. 7. In this case, however, gate bus line 42 passes on insulating substrate 41 instead of first capacitor electrode 51.

FIGS. 8A–8G are cross-sectional views illustrating a method of manufacturing a TFT array consistent with a first embodiment of the present invention taken along line C–C' in FIG. 4.

Figure 8A:
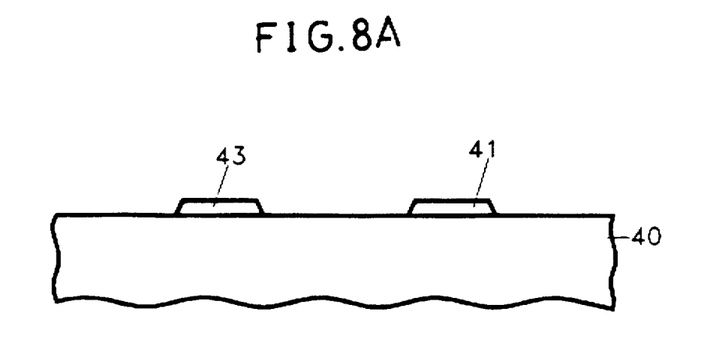
FIGS. 8A to 8G are cross-sectional views illustrating a method of manufacturing a TFT array consistent with the first embodiment of the present invention.

First, as shown in FIG. 8A, a conductive material is stacked on an insulating substrate 40 and patterned through a photolithography processes. A gate electrode 41 and a lower data bus line 43 are formed insulating layer 40 and are separated by a predetermined distance. Next, although not shown, a gate bus line is formed and connected to gate electrode 41. At the same time, a first capacitor electrode of a storage capacitor is patterned. In this embodiment, the gate bus line and the first capacitor electrode are formed in the same direction, and lower data bus line 43 is formed in a direction such that it crosses both elements. Lower data bus line 43 is formed to cut into the crossing part as shown in FIG. 4.

Figure 8B:
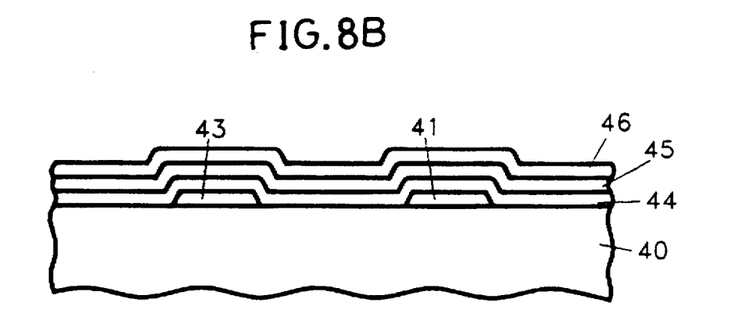
Figure 8C:
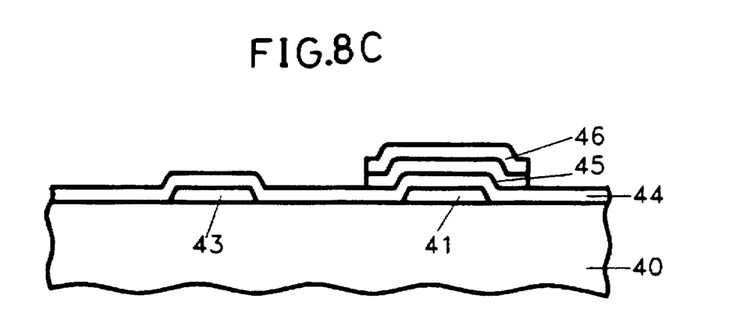

As shown in FIG. 8B, a gate insulating film 44, an undoped amorphous silicon layer 45, and an impurity-doped amorphous silicon layer 46 are successively deposited on substrate 40. As shown in FIG. 8C, impurity-doped amorphous silicon layer 46 and impurity-undoped amorphous silicon layer 45 are patterned in an island shape on a region above gate electrode 41.

Figure 8D:
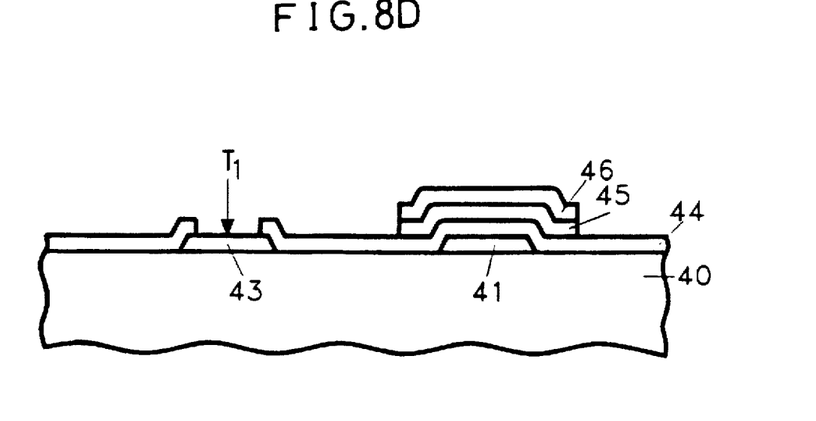

As shown in FIG. 8D, a first contact hole (T1) is formed in first insulating film 44, exposing a region of lower data bus line 43. First contact holes (T1) are formed in all regions of lower data bus line 43.

Figure 8E:
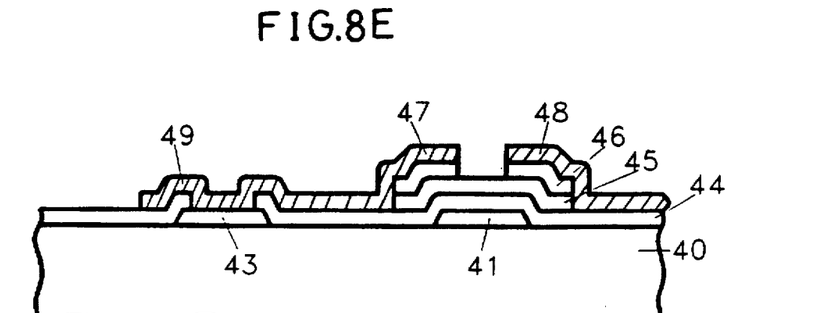

Then, as shown in FIG. 8E, a metal material is deposited on the entire surface of the substrate and patterned to form a source electrode 47, a drain electrode 48, and an upper data bus line 49 which connects all the separated lower data bus lines 43 together. At this time, first contact hole (T1) formed in first insulating film 44 is filled with the metal material, thereby connecting upper data bus line 49 with lower data bus line 43. Using drain electrode 48 and source electrode 47 as a mask, the impurity-doped amorphous silicon layer 46 is removed to expose a part of amorphous silicon layer 45.

Figure 8F:
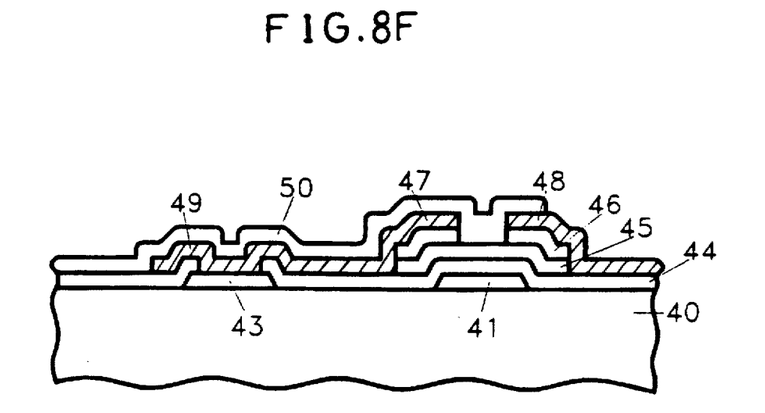
Figure 8G:
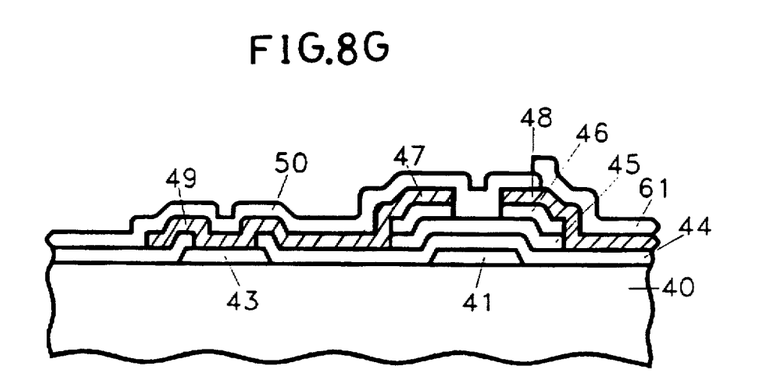

As shown in FIG. 8F, a passivation film 50 is formed on the entire surface and a second contact hole (T2) is formed on the region above drain electrode 48. As shown in FIG. 8G, a transparent conductive material 61, preferably, indium tin oxide (ITO), is deposited on the entire surface of the substrate including the inside of the second contact hole (T2), thereby completing the TFT array.

Figure 9:
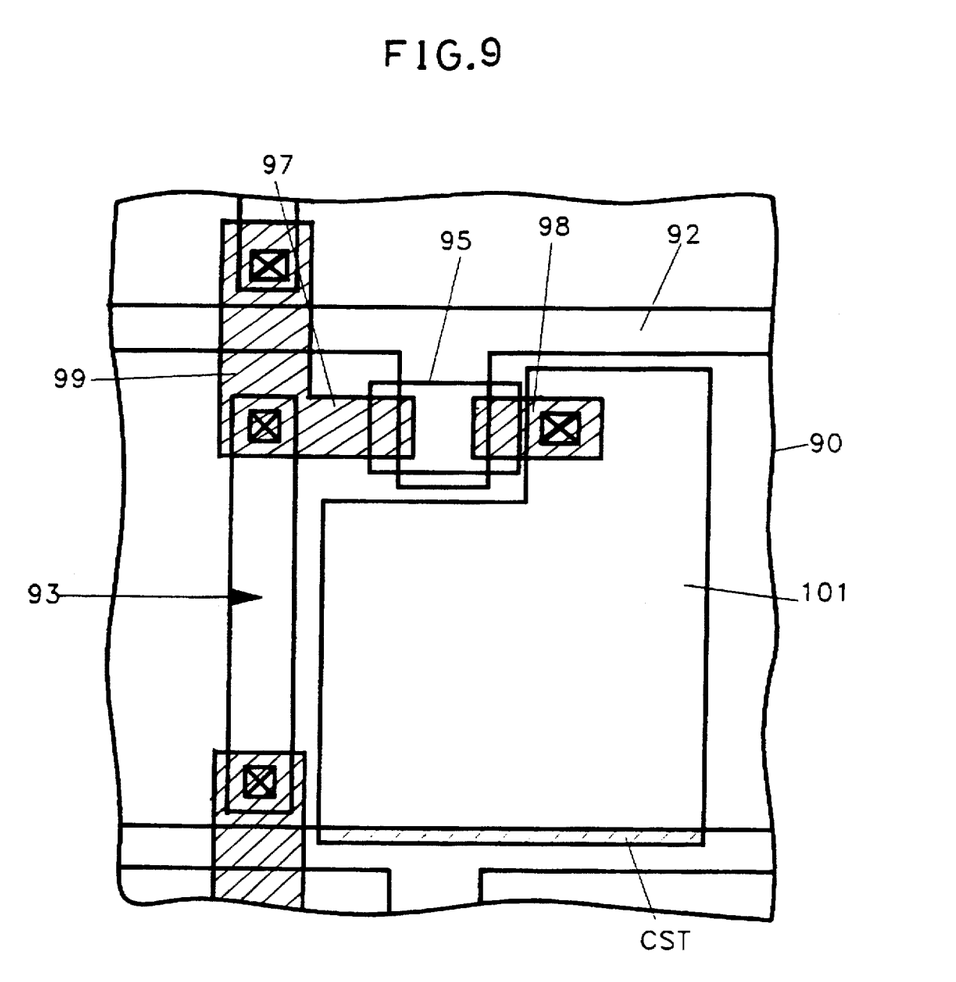
FIG. 9 is a plan view of a TFT array substrate consistent with a second embodiment of the present invention.

FIG. 9 is an another embodiment of a TFT array consistent with the present invention and shows a plan view illustrating the structure of the substrate. In this embodiment, a storage capacitor is formed to provide and additional capacity, not in the fashion of storage capacitor.

Preferably, the storage capacitor is formed by utilizing a pixel electrode 101 and a gate bus line 92 of the front end (or rear end) as two electrodes, and the capacitor electrode does not independently pass the lower part of the pixel electrode. Thus, a lower data bus line 93 is formed between two adjacent gate bus lines 92, so that an upper data bus line 99 crosses only part of gate bus line 92.

Figure 10:
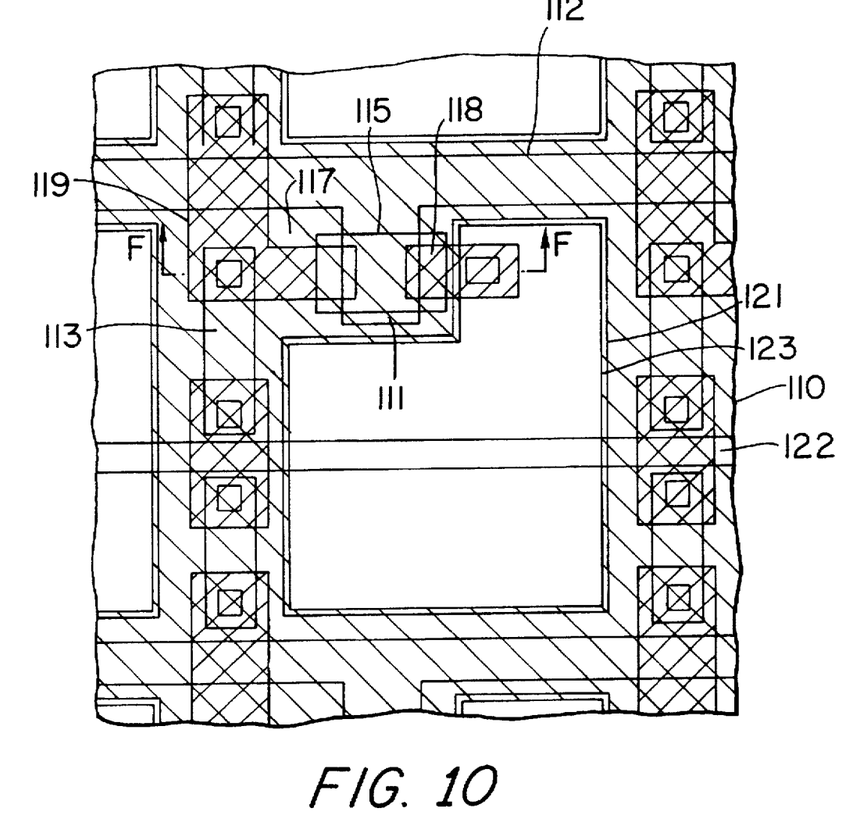
FIG. 10 is a plane view of a TFT array consistent with a third embodiment of the present invention.
Figure 11:
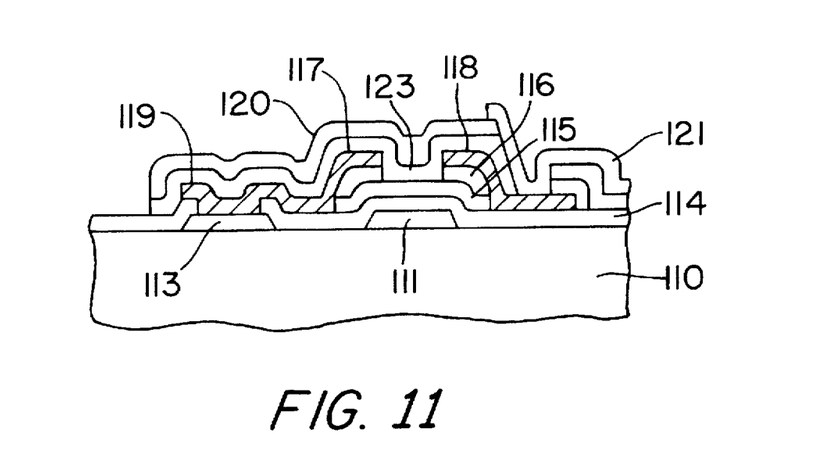
FIG. 11 is a cross-sectional view of the third embodiment of the present invention, taken along line F–F' in FIG. 10.

FIG. 10 is a plane view illustrating a structure in which a block matrix is directly formed on a TFT array of the present invention. FIG. 11 is a cross-sectional view taken along line F—F' in FIG. 10.

As shown in FIGS. 10 and 11, a gate bus line 112, a gate electrode 111, and a lower data bus line 113 are formed on an insulating substrate 110, and covered by a gate insulating film 114. An undoped amorphous silicon layer 115 and an impurity-doped amorphous silicon layer 116 are formed in an island shape on the area overlapping gate electrode 111. A source electrode 116 and a drain electrode 118 are formed on each impurity-doped amorphous silicon layer 116. Source electrode 117 connects to an upper data bus line 119. Further, a black matrix 123 consisting of an opaque black resin insulator is formed to cover gate bus line 112, upper and lower data bus lines 119 and 113, and the region of the TFT. A passivation film 120 is formed thereon and a pixel electrode 121 is formed connected through a second contact hole formed in passivation film 120 on the region of drain electrode 118. At this time, pixel electrode 121 is formed so that it partially overlaps the edge of black matrix 123.

As seen above, in the aforementioned embodiments, the second electrode, i.e., the source electrode and the upper and lower data bus lines, may be formed of the same ITO material used to form the pixel electrode.

According to the TFT array of the present invention as described above, the data bus line is formed at the lowest part of the structure and the pixel electrode is formed at the uppermost part of the structure. Thus, unlike the conventional structure, two or more insulating film (gate insulating film, passivation film) can be provided therebetween. As a result, the distance between the two electrodes is increased to reduce the capacity of a parasitic capacitance Cds. Further, the pixel electrode of the upper part is wider than that of the conventional structure, thereby increasing the aperture ratio.

It will be apparent to those skilled in the art that various modifications and variations can be made in a thin film transistor array and a method of manufacturing the same of the present invention without departing from the spirit or scope of the invention. Thus, it is intended that the is present invention cover the modifications and variations of this invention provided they come within the scope of the appended claims and their equivalents.

What is claimed is:

1. A liquid crystal display device, comprising:
   a substrate;
   first and second data bus line segments provided on said substrate; and
   a switching device provided on said substrate, said switching device having source and drain electrodes; and
   an interconnect electricaly coupling said first and second data bus line segments, said interconnect including the same conductive material as said source and drain electrodes.

2. A liquid crystal display device in accordance with claim 1, wherein said switching device includes a thin-film transistor.

3. A liquid crystal display device in accordance with claim 2, wherein said source electrode and said interconnect constitute a single metal layer.

4. A liquid crystal display device in accordance with claim 1, further comprising:
   a third data bus line segment provided on said substrate and spaced from said second data bus line segment; and
   a storage capacitor, an electrode of said storage capacitor extending between said second and third data bus line segments.

5. A liquid crystal display device in accordance with claim 4, further comprising:
   a connection portion electrically coupling said second and third bus line segments, said connection portion and said interconnect being formed of the same material.

6. A liquid crystal display device in accordance with claim 1, further comprising:
   a gate bus line extending between said first and second data bus line segments.

7. A liquid crystal display device in accordance with claim 6, wherein said gate bus line extends in a first direction and said first and second bus line segments extend in a second direction substantially perpendicular to said first direction.

8. A liquid crystal display device in accordance with claim 1, further comprising:
   a black matrix pattern provided over said switching device and said first and second data bus line segments, said black matrix pattern having an opening; and
   a pixel electrode provided in said opening of said black matrix pattern, said pixel electrode being electrically coupled to another electrode of said switching device.

9. A liquid crystal display device in accordance with claim 1, further comprising:
   a pixel electrode electrically coupled to said drain electrode of said switching device; and
   a plurality of insulating layers provided disposed between said pixel electrode and said substrate.

10. A method of manufacturing a liquid crystal display comprising the steps of
   depositing a first conductive layer on a substrate;
   patterning said first conductive layer to form first and second spaced data bus line segments;
   depositing an insulating layer on said substrate;
   selectively removing portions of said insulating layer to form openings over portions of said first and second data bus line segments;
   depositing a second conductive layer on said insulating layer and in said openings;
   patterning said second conductive layer to provide an interconnect electrically coupling said first and second bus line segments; and
   electrically coupling said interconnect to a doped region of a transistor formed on said substrate.

11. A method in accordance with claim 10, wherein said step of patterning said first conductive layer includes forming a third data bus line segment and a storage capacitor electrode, said third data bus line segment being spaced from said second data bus line segment, and said storage capacitor electrode extending between said first and second data bus line segments.

12. A method in accordance with claim 10, further comprising the step of:
   depositing a black matrix pattern on said substrate, said black matrix pattern covering said first and second data bus lines and said transistor.

13. A method in accordance with claim 10, further comprising the steps of:
   depositing a plurality of insulating layers on said substrate; and
   depositing a pixel electrode on said plurality of insulating layers.

* * * * *